United States Patent
Naruse (10) Patent No.: US 7,369,497 B2
(45) Date of Patent: May 6, 2008

(54) DATA COMMUNICATION SPEED CONTROL SYSTEM, TRANSMITTER APPARATUS AND RECEIVER APPARATUS

(75) Inventor: Tetsuya Naruse, Chiba (JP)

(73) Assignee: Sony Corporation, Tokyo (JP)

( * ) Notice: Subject to any disclaimer, the term of this patent is extended or adjusted under 35 U.S.C. 154(b) by 1054 days.

(21) Appl. No.: 10/149,453

(22) PCT Filed: Oct. 12, 2001

(86) PCT No.: PCT/JP01/08995

§ 371 (c)(1),
(2), (4) Date: Jun. 11, 2002

(87) PCT Pub. No.: WO02/32082

PCT Pub. Date: Apr. 18, 2002

(65) Prior Publication Data

US 2002/0191722 A1    Dec. 19, 2002

Related U.S. Application Data

(60) Provisional application No. 60/240,182, filed on Oct. 13, 2000.

(51) Int. Cl.
*H01J 1/16* (2006.01)
*H04L 12/26* (2006.01)
(52) U.S. Cl. ............... 370/235; 370/252; 370/253; 370/468; 370/230; 370/230.1; 370/232; 370/236
(58) Field of Classification Search ........... 370/465, 370/229–235, 240, 236.1, 236, 252, 253, 370/468, 477
See application file for complete search history.

(56) References Cited

U.S. PATENT DOCUMENTS 5,596,602 A * 1/1997 Couwenhoven et al. .... 375/240

(Continued)

FOREIGN PATENT DOCUMENTS

EP    0 535 860    4/1993

(Continued)

OTHER PUBLICATIONS

Vandalore V. et al: 'AquaFWin: Adaptive QoS Framework for Multimedia in Wireless Networks and its Comparison with other QoS Frameworks' Proceedings of the 24th IEEE Conference on Local Computer Networks (LCN'99), Oct. 17-20, 1999, Boston, MA, pp. 88-97.

(Continued)

*Primary Examiner*—Hassan Kizou
*Assistant Examiner*—Chuong Ho
(74) *Attorney, Agent, or Firm*—Frommer Lawrence & Haug LLP; William S. Frommer; Thomas F. Presson (57) ABSTRACT

This invention aims to make it possible to realize data communication having excellent communication throughput and good quality even if the communication state fluctuates. According to the present invention, by sequentially adjusting the transmission speed of data that is to be sent to the portable radio terminal 22 on the basis of momentary real transmission speed in the communication channel 6 that has been fed back from the portable radio terminal 22, and hereby controlling the data communication speed between itself and the portable radio terminal 22, it is able to execute data transmission processing that is corresponding to changes of transmission speed in the communication channel 6, in this way, it is able to realize data communication having excellent communication throughput and good quality even if the communication state fluctuates.

7 Claims, 10 Drawing Sheets

U.S. PATENT DOCUMENTS

| | | | |
|---|---|---|---|
| 5,768,527 A | | 6/1998 | Zhu et al. |
| 5,812,968 A | | 9/1998 | Hassan et al. |
| 5,815,502 A | * | 9/1998 | Saito et al. ............... 370/468 |
| 5,822,318 A | * | 10/1998 | Tiedemann et al. ......... 370/391 |
| 6,097,697 A | * | 8/2000 | Yao et al. ................ 370/230 |
| 6,141,326 A | * | 10/2000 | Minami .................... 370/244 |
| 6,345,039 B1 | * | 2/2002 | Ito ........................ 370/232 |
| 6,392,993 B1 | * | 5/2002 | Hamilton et al. ........... 370/230 |
| 6,400,731 B1 | * | 6/2002 | Nitta ...................... 370/468 |
| 6,405,020 B1 | | 6/2002 | Oestreich et al. |
| 6,445,679 B1 | * | 9/2002 | Taniguchi et al. .......... 370/232 |
| 6,563,810 B1 | * | 5/2003 | Corazza .................... 370/335 |
| 6,577,599 B1 | * | 6/2003 | Gupta et al. ............... 370/236 |
| 6,765,904 B1 | * | 7/2004 | Anandakumar et al. .... 370/389 |
| 6,963,538 B1 | * | 11/2005 | Giroux et al. ........... 370/236.1 |
| 7,259,876 B2 | * | 8/2007 | Obata et al. ............... 358/1.13 |
| 2003/0011821 A1 | * | 1/2003 | Obata et al. ............... 358/1.16 |

FOREIGN PATENT DOCUMENTS

| | | |
|---|---|---|
| EP | 0 763 944 | 3/1997 |
| EP | 0 869 647 | 10/1998 |
| EP | 0 964 541 | 12/1999 |
| EP | 1 017 207 | 7/2000 |
| JP | 5-328083 | 12/1993 |
| JP | 5-328084 | 12/1993 |
| JP | 7-170290 | 7/1995 |
| JP | 11 98 128 | 4/1999 |
| JP | 11-187367 | 7/1999 |
| JP | 11 355854 | 12/1999 |
| JP | 2000-174693 | 6/2000 |
| WO | WO 99 12304 | 3/1999 |
| WO | WO 99 16204 | 4/1999 |
| WO | WO 00 10357 | 2/2000 |

OTHER PUBLICATIONS

Van Der Scharr M. et al: 'Scalable MPEG-4 Video Coding with Graceful Packet-loss Resilience over Bandwidth-varying Networks' ICME 2000, vol. 3, pp. 1487-1490, 2000.

Novell M. et al: 'Error Resilient Variable Length Encoder/Decoder for Low Power Wireless Video Codecs'. Proceedings of the IEEE Midwest Symposium on Circuits and Systems, Las Cruces, NM, Aug. 1999, vol. 2, pp. 1086-1089.

Patent Abstracts of Japan, vol. 2000, No. 2, Feb. 29, 2000 & JP 11 331296 A (Kokusai Electric Co Ltd), Nov. 30, 1999.

* cited by examiner

DATA COMMUNICATION SPEED CONTROL SYSTEM, TRANSMITTER APPARATUS AND RECEIVER APPARATUS

RELATED APPLICATION DATA

This application claims priority to provisional application 60/240,182, filed Oct. 13, 2000, and the disclosure of that application is incorporated herein to the extent permitted by law.

TECHNICAL FIELD

This invention is directed to a data communication speed control system, a transmitting apparatus, and a receiving apparatus, and suited to be applied to, for instance, a radio communication system that is constructed with a server, which serves as a transmitting apparatus for supplying contents data that comprises images, voices and so on, and a portable radio terminal, which serves as a receiving apparatus that is supplied with the contents data from the server.

BACKGROUND ART

Figure 8:
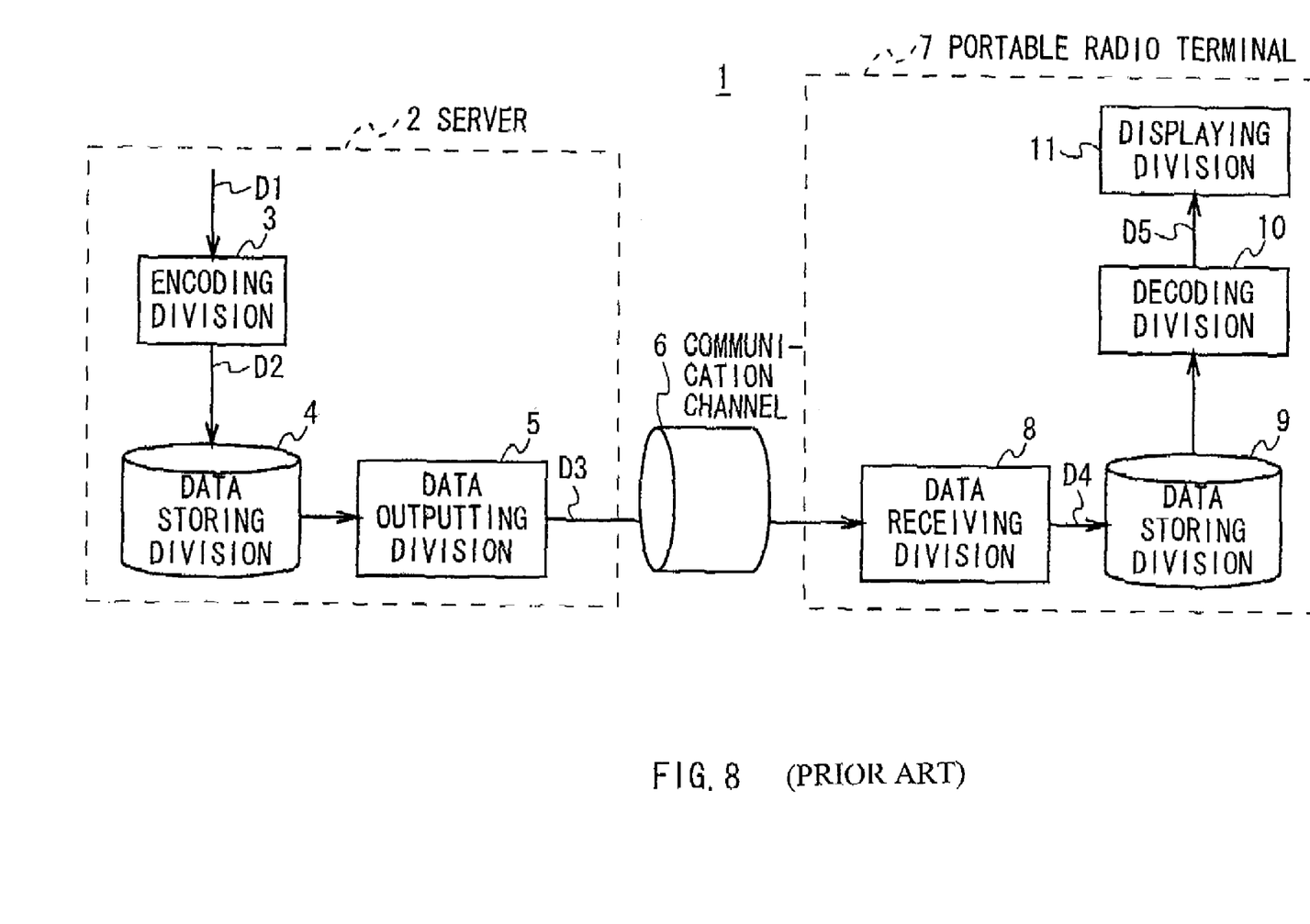
FIG. 8 is a schematic block diagram showing a configuration of a conventional radio communication system.

A conventional radio communication system 1 is comprised of a server 2 and a portable radio terminal 7 as shown in FIG. 8, and a streaming data D3 is transmitted from the server 2 to the portable radio terminal 7 through a communication channel 6.

That is, the server 2 inputs contents data D1 to an encoding division 3 at first. The encoding division 3 performs compression coding of the contents data D1 with the stated compression coding system, and once stores the resulted coded data D2 in the data storing division 4, and then supplies this to the data outputting division 5.

The data outputting division 5 adds error correcting code to the coded data D2, transforms it into packets, modulates it in accordance with the stated modulating system, generates the streaming data D3 hereby, and transmits this to the portable radio terminal 7 via the communication channel 6.

As to the communication channel 6, the streaming data D3 is sent to a base station (not shown) with a wired system, while it is sent from the base station to the portable radio terminal 7 with a wireless system, so it is variously influenced by changes of the transmission situation in the wireless section.

The portable radio terminal 7 receives the streaming data D3 by means of the data receiving division 8, applies demodulation processing and error correction processing to it, obtains the demodulated data D4 hereby, and once stores this in the data storing division 9, and then sends this to a decoding division 10.

The decoding division 10 decodes the demodulated data D4, sends the resulted decoded data D5 to the displaying division 11, and displays the contents of the contents via the displaying division 11, and allows the user to view and listen to it hereby.

Figure 9:
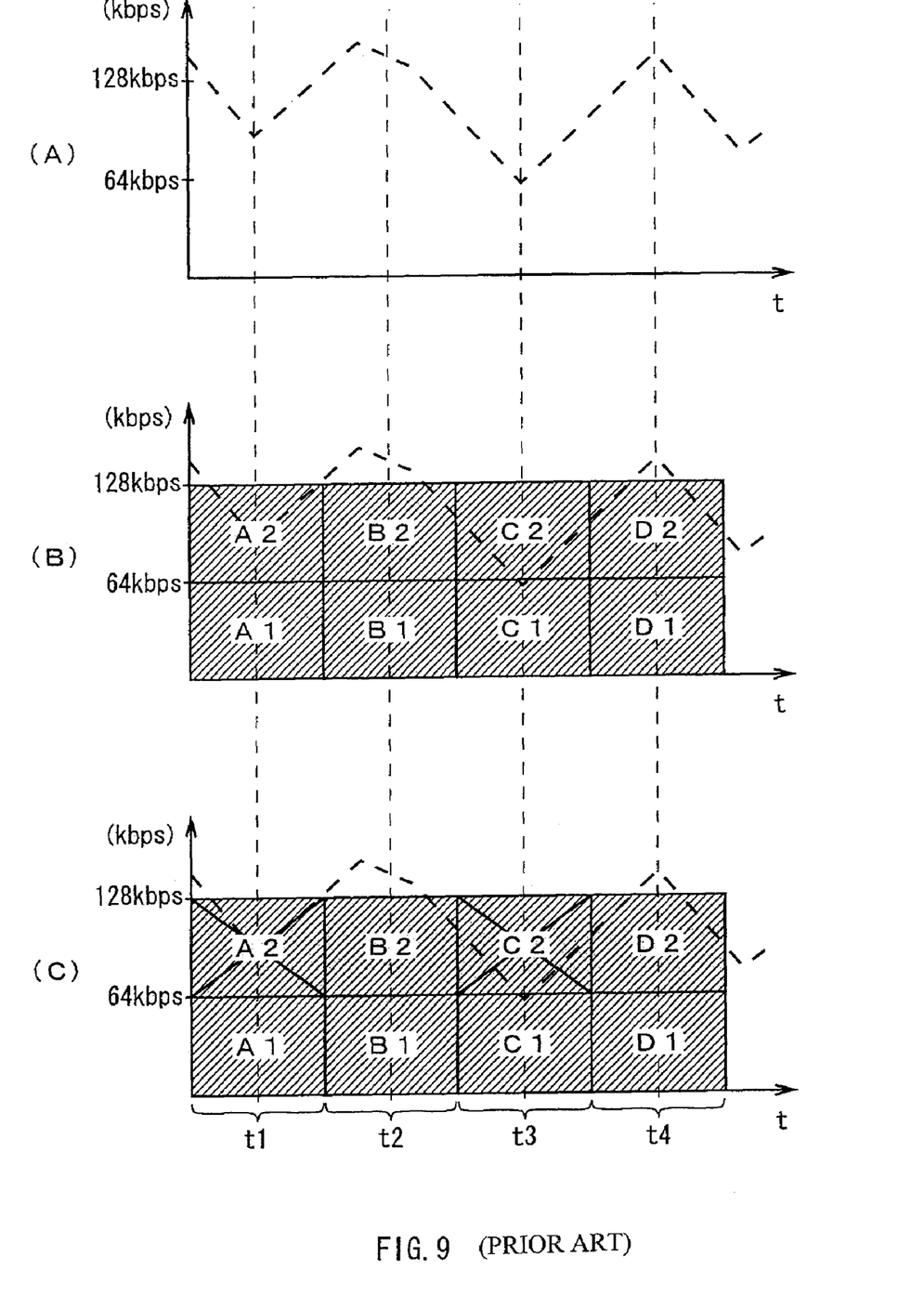
FIG. 9 is a schematic diagram showing a transmission situation of the data communication speed of 128 [kbps].

By the way, in the radio communication system 1 having such a construction, in the case where the transmission speed (shown with a broken line) on the communication channel 6 varies every moment in t1 section, t2 section, t3 section, t4 section, and the following sections (not shown) as shown in FIG. 9(A), while the streaming data D3 is sent from the server 2 to the portable radio terminal 7 at the transmission speed of 128 [kbps] as shown in FIG. 9(B), it is not able to send whole data of A2 portion and C2 portion (shown with a X mark) out of the streaming data D3, because the transmission speed on the communication channel 6 changes in practice as shown in FIG. 9(C).

In this case, it is not able to exactly apply error correction processing to the data of A2 portion and C2 portion out of the streaming data D3 with the data receiving division 8 of the portable radio terminal 7, and, as a result, the data itself of A2 portion and C2 portion is missed.

Figure 10:
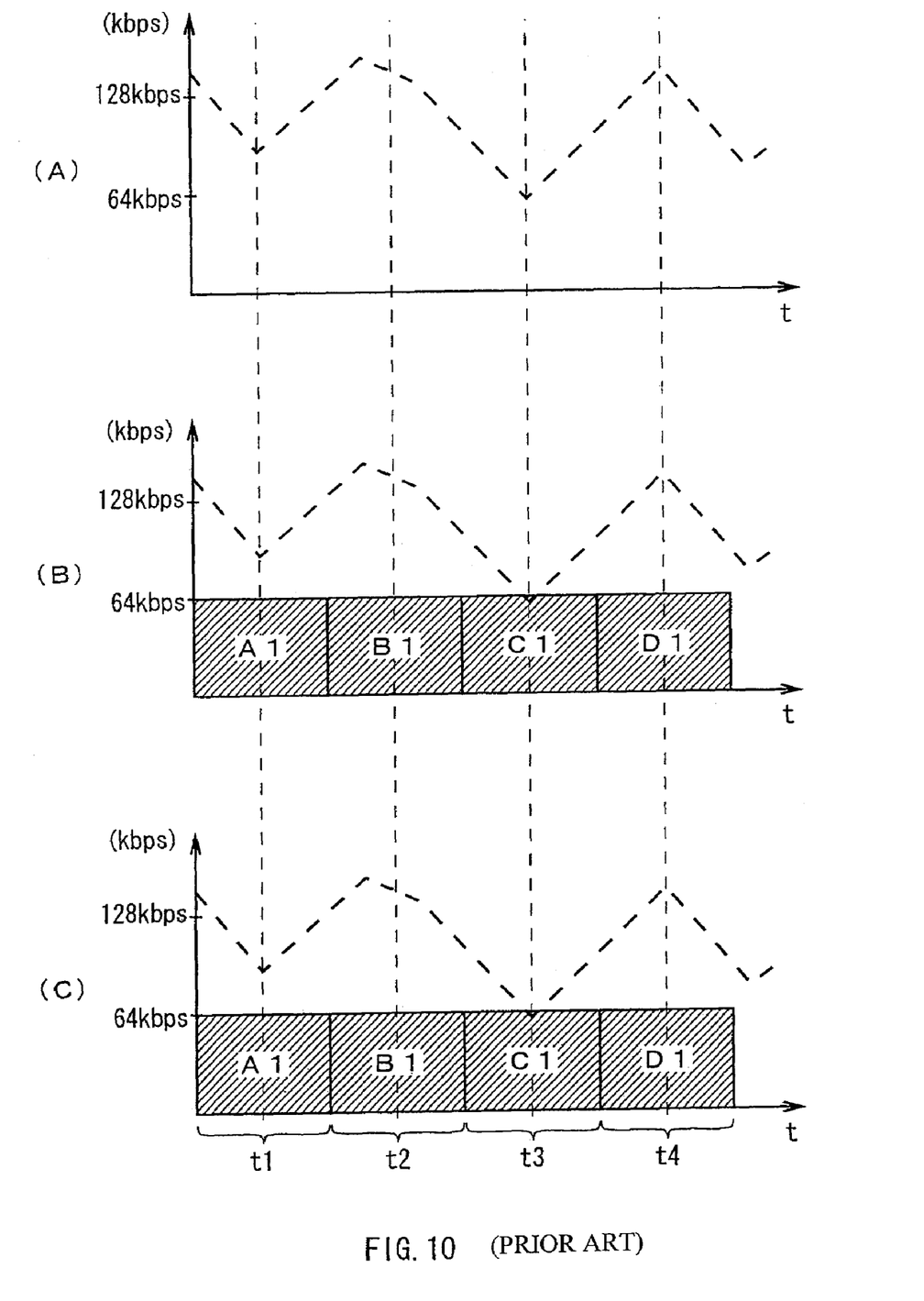
FIG. 10 is a schematic diagram showing a transmission situation of the data communication speed of 64 [kbps].

So, in order to avoid such missing of data, in the radio communication system 1, in the case where the instantaneous real transmission speed in the communication channel 6 varies every moment in t1 section-t4 section as shown in FIG. 10(A), which has the same contents as that of FIG. 9(A), in the case where the streaming data D3 has been transmitted from the server 2 at the transmission speed of 64 [kbps], which is the minimum value of the transmission speed, as shown in FIG. 10(B), the portable radio terminal 7 is able to receive the whole data without missing though the quantity of data transmission becomes the half of that of the transmission speed of 128 [kbps], as shown in FIG. 12(C).

However, in this case, though it is originally able to transmit at the transmission speed of 128 [kbps] without missing with respect to t2 section and t4 section, it transmits at the transmission speed of only 64 [kbps], so the communication capacity in the communication channel 6 can not be utilized effectively.

Thus, as to the radio communication system 1, in the case where the streaming data D3 is sent at the transmission speed of 128 [kbps], A2 portion and C2 portion out of the streaming data D3 that are to be received by the portable radio terminal 7 of the receiving side are missed; in the case where the streaming data D3 is sent at the transmission speed of 64 [kbps], whole data can be received with the portable radio terminal 7, however, the quantity of the data becomes about the half; thus, there has been such a problem that the communication throughput is poor anyway.

DESCRIPTION OF THE INVENTION

Considering aforementioned respects, this invention proposes a data communication speed control system, a transmitting apparatus, and a receiving apparatus that can realize data communication having excellent communication throughput and good quality even if the communication state fluctuates.

To solve such a problem, the present invention provides a data communication speed control system for controlling data communication speed between a transmitting apparatus, which transmits a data, and a receiving apparatus, which receives the data from the transmitting apparatus via the stated communication channel, said system comprises: a receiving apparatus that sequentially detects instantaneous real transmission speed on the communication channel, on the basis of the received data that has been delivered from the transmitting apparatus, and sequentially notifies the real transmission speed to the transmitting apparatus; and said transmitting apparatus that sequentially adjust the transmission speed of data that is to be sent to the receiving apparatus, on the basis of the real transmission speed, so as to control the data communication speed between itself and the receiving apparatus.

By sequentially adjusting the transmission speed of data that is to be sent to the receiving apparatus, on the basis of the instantaneous real transmission speed on the communication channel that has been fed back from the receiving apparatus, and controlling the data communication speed to the receiving apparatus, it is able to implement data transmission processing that is accommodated to changes of transmission speed on communication channel in real time.

Besides, the present invention provides a data communication speed control system for controlling data communication speed between a transmitting apparatus, which transmits a data, and a receiving apparatus, which receives the data from the transmitting apparatus via the stated communication channel, said system comprises: a receiving apparatus that sequentially detects instantaneous real transmission speed on the communication channel, on the basis of the received data that has been delivered from the transmitting apparatus, and sequentially notifies the real transmission speed to the transmitting apparatus; and a transmitting apparatus that sequentially adjust the compression rate of data that is to be sent to the receiving apparatus, on the basis of the real transmission speed.

By sequentially adjusting the compression rate of data that is to be sent to the receiving apparatus, in real time, on the basis of the instantaneous real transmission speed on the communication channel that has been fed back from the receiving apparatus, it is able to perform efficient data transmission without missing of data even if the transmission speed on the communication channel fluctuates.

BEST MODE FOR CARRYING OUT THE INVENTION

An embodiment of the present invention will be described in detail hereinafter with reference to the drawings.

(1) General Configuration of the Radio Communication System

Figure 1:
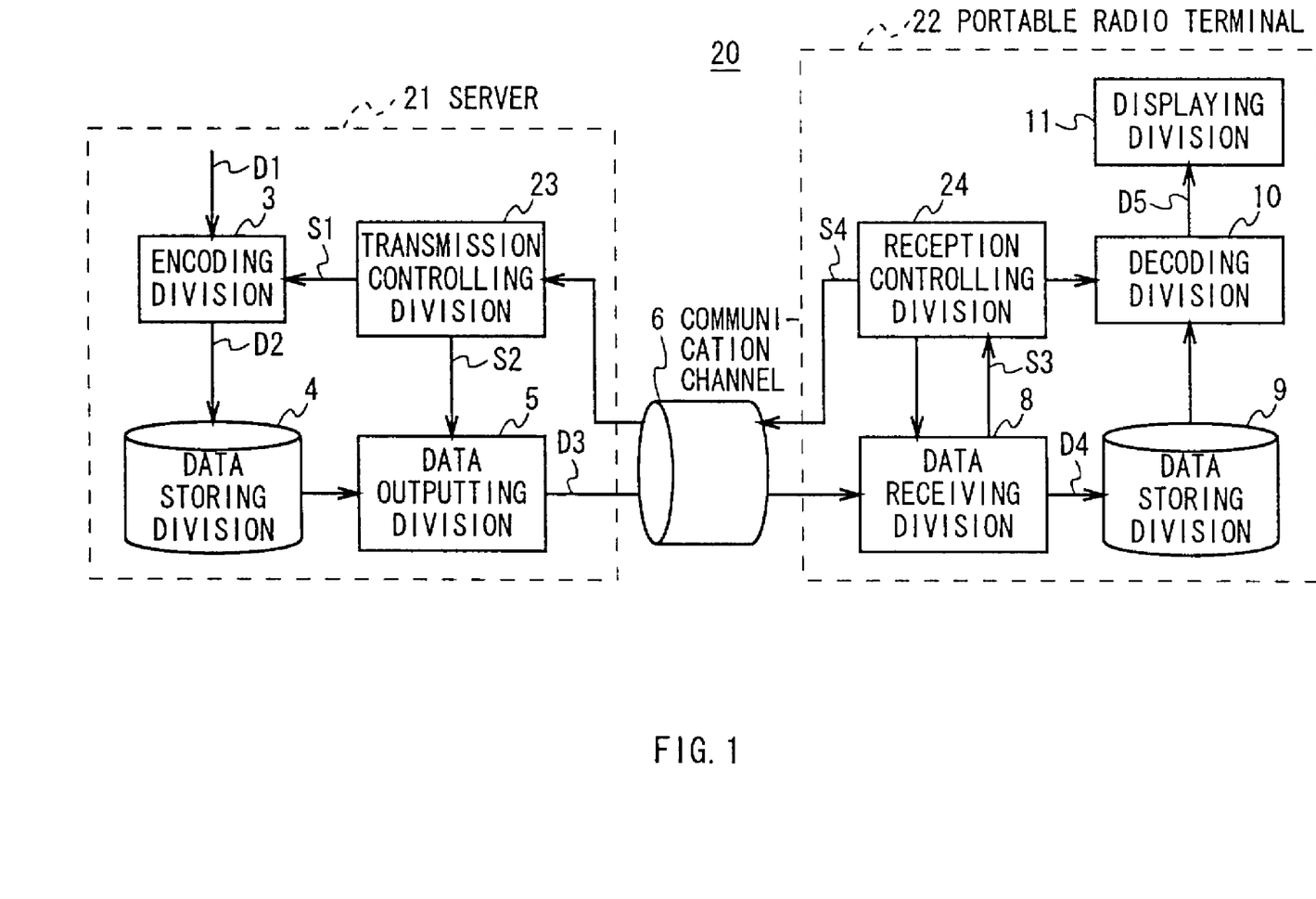
FIG. 1 is a schematic block diagram showing a configuration of a radio communication system of an embodiment of the present invention.

In FIG. 1, which has the same reference numerals as those of FIG. 8 on its portions corresponding to the portions of FIG. 8, the reference numeral 20 shows, as a whole, a radio communication system that operates as a data communication speed control system of the present invention; it has nearly the same configuration as that of the conventional radio communication system 1, but a server 21 comprises a transmission controlling division 23 and a portable radio terminal 22 comprises a reception controlling division 24 additionally.

The server 21 first inputs a contents data D1 of, for instance, motion picture that is to be transmitted, to the encoding division 3. The encoding division 3 is arranged so as to set a compression rate that is corresponding to the compression rate controlling signal S1 given from the transmission controlling division 23, which is formed of a micro-processor, and perform compression coding of the contents data D1 with the set compression rate.

In this way, the encoding division 3 performs compression coding of the very contents data D1 with the stated compression coding system and with a compression rate that is corresponding to the compression rate controlling signal S1, once stores the resulted coded data D2 in the data storing division 4, and then supplies this to the data outputting division 5.

The data outputting division 5 adds an error correcting code to the coded data D2, transforms it into packets, modulates it in accordance with the stated modulating system, and generates the streaming data D3 hereby.

Then the data outputting division 5 sets the transmission speed of the data that is delivered from the data outputting division 5, in response to the transmission speed controlling signal S2 given from the transmission controlling division 23, and transmits the streaming data D3 to the portable radio terminal 22 via the communication channel 6 at the transmission speed that has been set.

As to the communication channel 6, the streaming data D3 is sent until a base station (not shown) through a wired channel, and sent from the base station until the portable radio terminal 22 through a wireless channel, so it is variously influenced by changes of data transmission situation in the wireless section, that is the section between the base station and the portable radio terminal 22.

The portable radio terminal 22 receives the streaming data D3 with the data receiving division 8, applies demodulation processing and error correction processing to it, obtains the demodulated data D4 hereby, once stores this in the data storing division 9, and then sends this to the decoding division 10.

At the same time, the data receiving division 8 calculates the packet loss rate by counting the number of packet errors in, for instance, the received streaming data D3, and supplies the calculated packet loss rate S3 to the reception controlling division 24, which is formed of a micro-processor.

The decoding division 10 decodes the demodulated data D4, sends the resulted decoded data D5 to the displaying division 11, displays the contents of the contents through the displaying division 11, and allows the user to view and listen to it hereby.

By the way, the reception controlling division 24 is arranged so as to predict an instantaneous real transmission speed on the communication channel 6 on the basis of the result of the calculation S3 that has been supplied from the data receiving division 8, and to feed back this to the transmission controlling division 23 of the server 21 via the communication channel 6 as the prediction result signal S4.

The transmission controlling division 23 of the server 21 is able to receive a prediction result signal S4 that has been sent from the reception controlling division 24 of the portable radio terminal 22, and to recognize the instantaneous real transmission speed on the portable radio terminal 22 on the basis of the prediction result signal S4.

By outputting the compression rate controlling signal S1 that is corresponding with the instantaneous real transmission speed of the portable radio terminal 22 to the encoding division 3, or by outputting the data transmission speed controlling signal S2 that is corresponding with the instantaneous real transmission speed to the data outputting division 5, the transmission controlling division 23 of the server 21 is able to control the compression rate at the encoding division 3 or to control the data transmission speed at the data outputting division 5.

Figure 2:
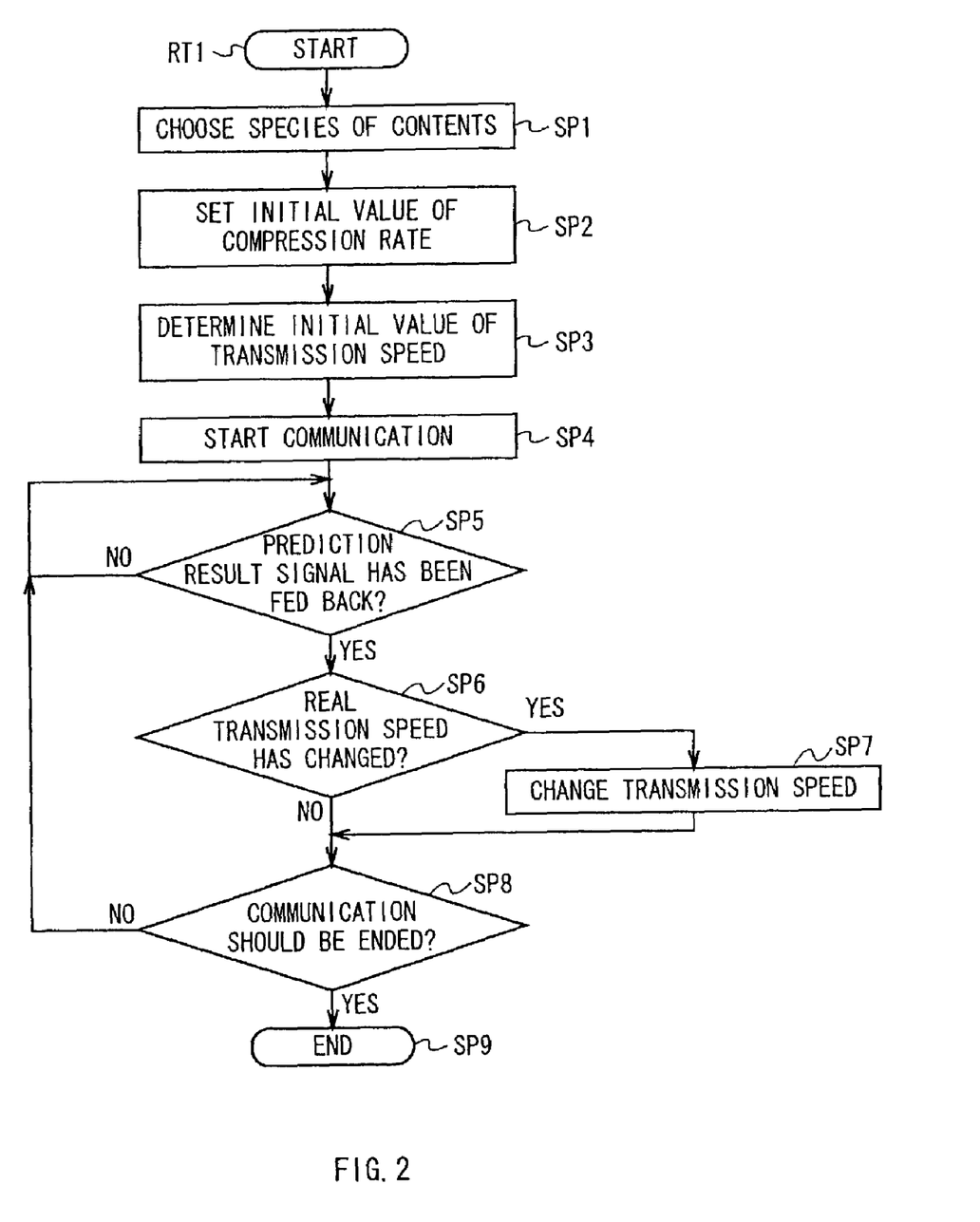
FIG. 2 is a flow chart showing a procedure of the data communication speed controlling that is corresponding with changes of the reception communication capacity.

(2) Procedure of Data Transmission Speed Controlling in Response to Changes of Real Transmission Speed As shown in FIG. 2, the transmission controlling division 23 of the server 21 enters the start step of the routine RT1, and goes to the step SP1. At the step SP1, the transmission controlling division 23 chooses the species (motion picture data, text data, voice data and so on) of the contents data D1 that is to be transmitted to the portable radio terminal 22 in response to the user's request, and then goes to the following step SP2.

At the step SP2, the transmission controlling division 23 sets the initial value of compression rate at the encoding division 3, and then goes to the following step SP3.

At the step SP3, the transmission controlling division 23 sets the initial value of data transmission speed at the data outputting division 5 to, for instance, 128 [kbps], which is the usual transmission speed of the case where the communication channel 6 do not affect it, and then goes to the following step SP4.

At the step SP4, the transmission controlling division 23 starts data communication processing by performing compression coding process, data outputting process and so on relevant to the contents data D1 with the encoding division 3 and the data outputting division 5, and then goes to the following step SP5.

At the step SP5, the transmission controlling division 23 judges whether the prediction result signal S4, which shows the instantaneous real transmission speed, has been fed back to it from the reception controlling division 24 of the portable radio terminal 22 or not; if the negative result has been obtained, it waits for receiving of the feed-back while it continuing the data communication processing.

In contrast to this, when the positive result has been obtained at the step SP5, the transmission controlling division 23 goes to the following step SP6; it always monitors the prediction result signal S4, which is sequentially delivered from the reception controlling division 24 of the portable radio terminal 22, and judges whether momentary changes exist in the real transmission speed or not.

If the negative result has been obtained at this point, the transmission controlling division 23 goes to the following step SP8. In contrast to this, when the positive result has been obtained at the step SP6, this means that a momentary change has been found in the real transmission speed as a result of monitoring of the prediction result signal S4, which is sequentially delivered from the reception controlling division 24 of the portable radio terminal 22, by the transmission controlling division 23, it then goes to the following step SP7.

Figure 3:
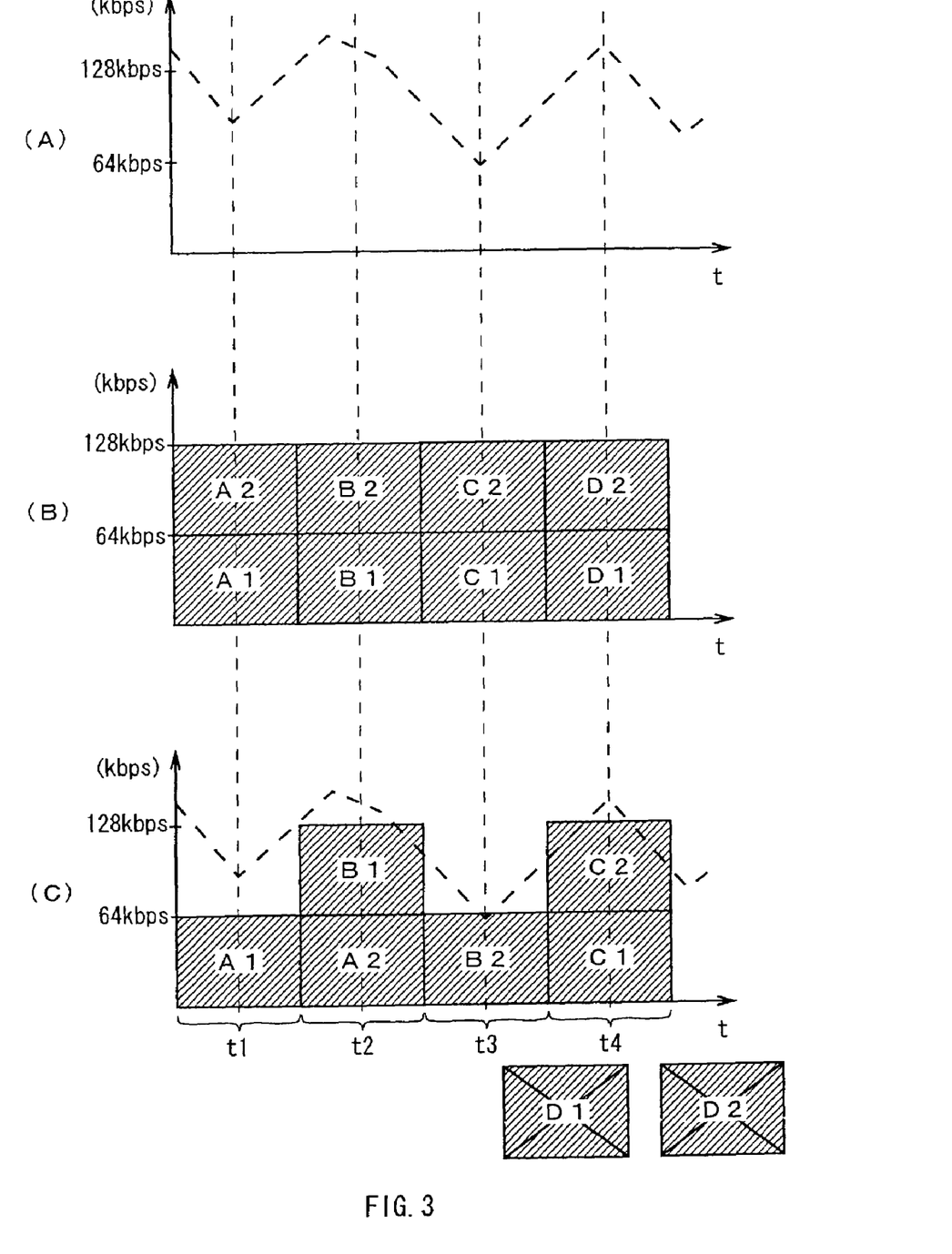
FIG. 3 is a schematic diagram showing a transmission situation of the case where the data communication speed control processing has been carried out.

Herein, existing of momentary changes in the real transmission speed means such a situation that the transmission speed changes every moment from 64 [kbps] to 128 [kbps] during t1 section-t4 section as shown in FIG. 3(A), which has the same contents as those of FIG. 9(A) and FIG. 10(A).

By the way, FIG. 3(B) shows such a state that the compression rate of the encoding division 3 is held uniform in response to the data transmission speed (128 [kbps]) that has been initially set at the step SP3.

For the purpose of description, it is assumed that A1 (B1, C1 and D1) portion represents an odd field, and A2 (B2, C2 and D2) portion represents an even field, and 1 flame of picture data is comprised of combined A1 portion and A2 portion.

At the step SP7, the transmission controlling division 23 outputs the data transmission speed controlling signal S2 to the data outputting division 5, so as to cause the data outputting division 5 to set data transmission speed of t1 section to 64 [kbps], to cause it to set data transmission speed of the following t2 section to 128 [kbps], to cause it to set data transmission speed of t3 section to 64 [kbps] again, and to cause it to set data transmission speed of t4 section to 128 [kbps], in accordance with momentary changes in the real transmission speed in t1 section-t4 section, and then it goes to the following step SP8.

By controlling the data transmission speed in accordance with momentary changes in the real transmission speed in this way, the transmission controlling division 23 controls the data transmission speed for each section t1-t4 so that it becomes 64 [kbps] or 128 [kbps].

In this case, the transmission controlling division 23 has set the data transmission speed to 64 [kbps] in t1 section in which the compression rate of the encoding division 3 is 128 [kbps], therefore, A2 portion can not be transmitted within t1 section.

So, the transmission controlling division 23 stores this A2 portion, which has not been transmitted yet, in the data storing division 4 and causes it to wait for, and transmits it in the following t2 section of 128 [kbps], and transmits B1 portion also, which has been originally scheduled to be transmitted in the t2 section.

As to the next t3 section in which the compression rate of the encoding division 3 is maintained to 128 [kbps], because the transmission controlling division 23 has set the data transmission speed to 64 [kbps], it transmits only B2 portion. In the next t4 section in which the data transmission speed is returned to 128 [kbps], the remaining C1 portion and C2 portion are transmitted.

But the transmission controlling division 23 of the server 21 is not able to transmit D1 portion and D2 portion, which have been originally scheduled to be transmitted in t4 section, within t4 section, therefore, in the case of contents that need real-time operation in particular, such a disadvantage exists that picture data of 1 frame that is comprised of D1 portion and D2 portion of the streaming data D3 can not be transmitted ultimately.

At the step SP8, the transmission controlling division 23 judges whether the data communication processing of the contents data D1 has been ended or not; if not ended, it obtains the negative result, returns to the step SP5, and repeats the above-mentioned processing.

When the positive result has been obtained contrarily at the step SP8, the transmission controlling division 23 decides that the data communication processing should be ended, goes to the following step SP9, and ends the data transmission speed controlling procedure.

Figure 4:
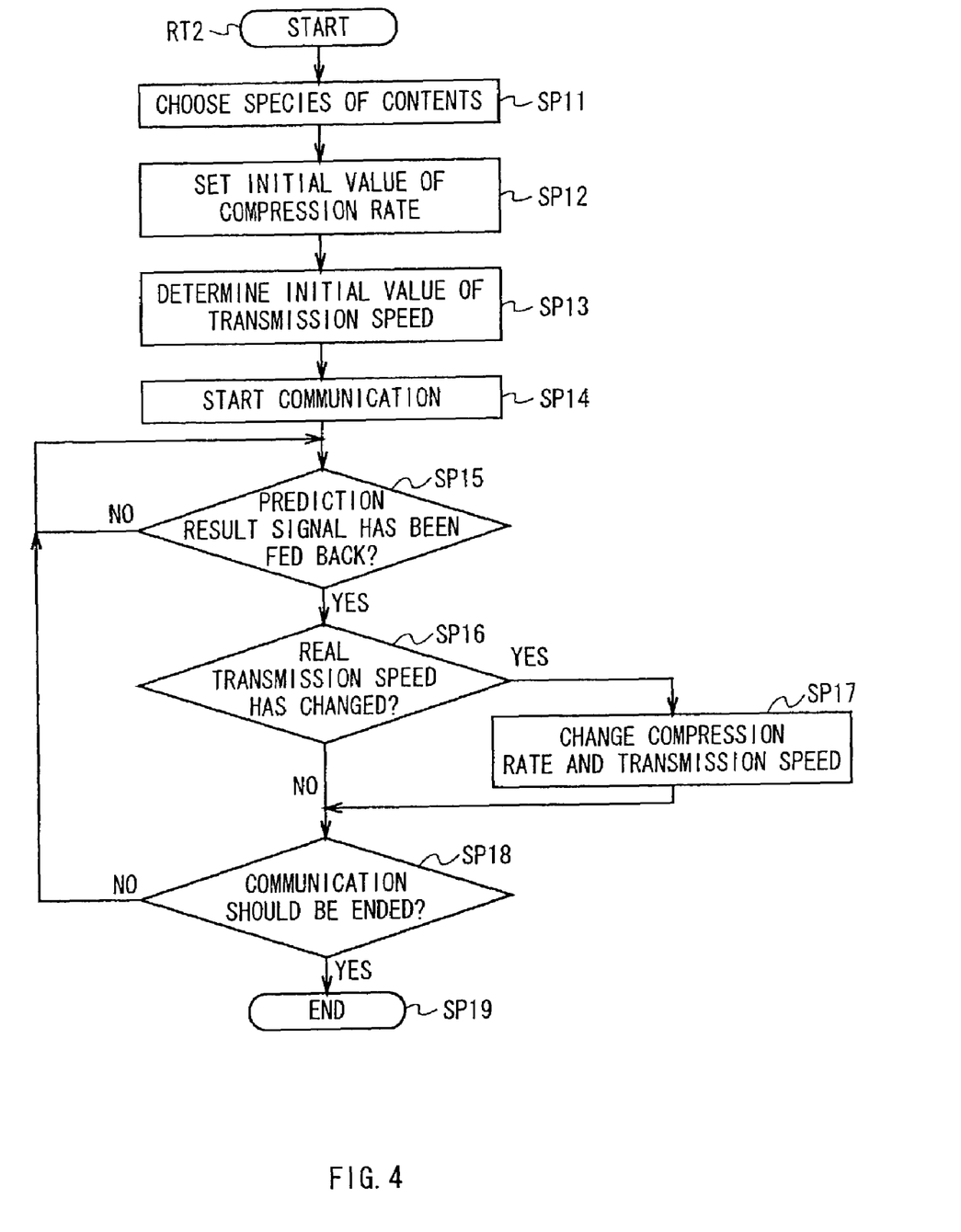
FIG. 4 is a flow chart showing a procedure of the compression rate controlling that is corresponding with changes of the reception communication capacity.

(3) Procedure of Compression Rate Controlling in Response to Changes of Real Transmission Speed As shown in FIG. 4, the transmission controlling division 23 of the server 21 enters the start step of the routine RT2, and goes to the step SP11. In this connection, the steps SP11-SP18, excepting the step SP17, are basically same as the transmission speed controlling procedure of the routine RT1. At the step SP11, the transmission controlling division 23 chooses the species (motion picture data, text data, voice data and so on) of the contents data D1 that is to be transmitted to the portable radio terminal 22, and then goes to the following step SP12.

At the step SP12, the transmission controlling division 23 sets the initial value of compression rate at the encoding division 3, and then goes to the following step SP13. At the step SP13, the transmission controlling division 23 sets the initial value of data transmission speed at the data outputting division 5 to, for instance, 128 [kbps], and then goes to the following step SP14.

At the step SP14, the transmission controlling division 23 starts data communication processing by performing compression coding process, data outputting process and so on relevant to the contents data D1 with the encoding division 3 and the data outputting division 5, and then goes to the following step SP15.

At the step SP15, the transmission controlling division 23 judges whether the prediction result signal S4, which shows the instantaneous real transmission speed, has been fed back to it from the reception controlling division 24 of the portable radio terminal 22 or not; if the negative result has been obtained, it waits for receiving of the feed-back while it continuing the data communication processing.

In contrast to this, when the positive result has been obtained at the step SP15, the transmission controlling division 23 goes to the following step SP16, monitors the prediction result signal S4, which is sequentially delivered from the reception controlling division 24 of the portable radio terminal 22, and judges whether momentary changes exist in the real transmission speed or not.

If the negative result has been obtained at this point, the transmission controlling division 23 goes to the following step SP18. In contrast to this, when the positive result has been obtained at the step SP16, this means that a momentary change has been found in the real transmission speed as a result of monitoring of the prediction result signal S4, which is sequentially delivered from the reception controlling division 24 of the portable radio terminal 22, by the transmission controlling division 23, it then goes to the following step SP17.

Figure 5:
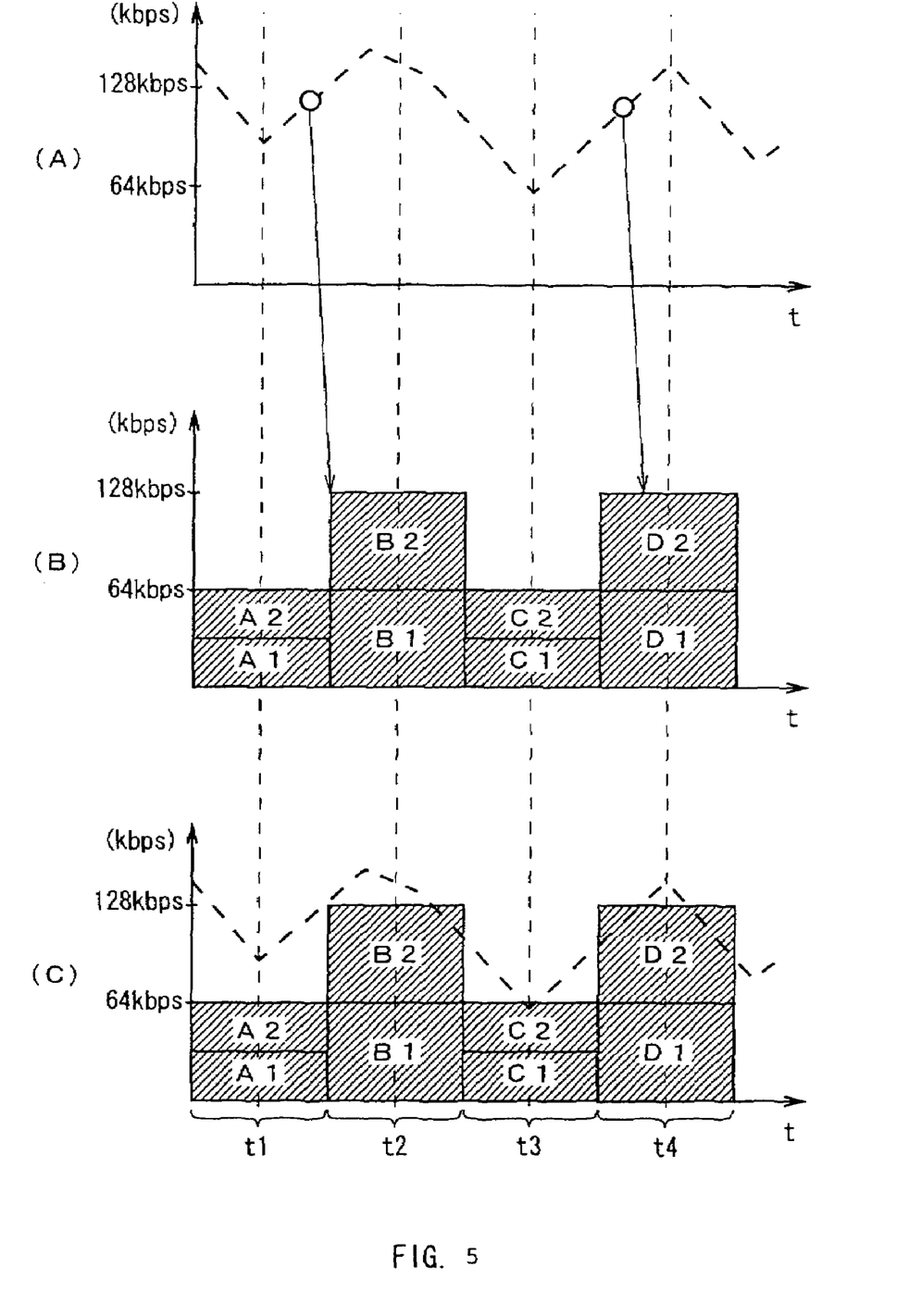
FIG. 5 is a schematic diagram showing a transmission situation of the case where the compression rate control processing has been carried out.

Herein, existing of momentary changes in the real transmission speed means such a situation that the real transmission speed changes every moment from 64 [kbps] to 128 [kbps] during t1 section-t4 section as shown in FIG. 5(A), which is similar to FIG. 3(A).

At the step SP17, as shown in FIG. 5(B) and FIG. 5(C), the transmission controlling division 23 outputs the compression rate controlling signal S1 to the encoding division 3 and outputs the data transmission speed controlling signal S2 to the data outputting division 5, so as to cause them to set compression rate of t1 section to about two times the initial value and to set data transmission speed of t1 section to 64 [kbps], which is corresponding to that compression rate, to cause them to return compression rate of the following t2 section to the initial value and to set data transmission speed of t2 section to 128 [kbps], which is corresponding to the initial value, to cause them to set compression rate of t3 section to about two times the initial value again and to set data transmission speed of t3 section to 64 [kbps] again, which is corresponding to that compression rate, and to cause them to return compression rate of t4 section to the initial value and to set data transmission speed of t4 section to 128 [kbps], which is corresponding to the initial value, in accordance with changes in the real transmission speed in t1 section-t4 section, and then it goes to the following step SP18.

In this case, in t1 section and t3 section, the transmission controlling division 23 is able to transmit overall picture data of 1 frame although slight deterioration of picture quality exist owing to the doubled compression rate, because the streaming data D3 of A portion (A1 portion+A2 portion) and C portion (C1 portion+C2 portion) that has been subjected to compression coding with the compression rate that has been set to the almost doubled value in the encoding division 3 is transmitted.

On the other hand, in t2 section and t4 section, the transmission controlling division 23 is able to surely transmit picture data of 1 frame with the data transmission speed of 128 [kbps] that has been set as the initial value, because the streaming data D3 of B portion (B1 portion+B2 portion) and D portion (D1 portion+D2 portion) that has been subjected to compression coding with the compression rate that has been set as the initial value in the encoding division 3 is transmitted.

By this, the transmission controlling division 23 of the server 21 is able to execute adaptive compression rate control processing that is corresponding to momentary real transmission speed of the portable radio terminal 22, in this way, it is able to improve the communication throughput, and also able to surely transmit field images without missing of them.

In this connection, the data storage capacity of the data storing division 4 is set to such an extent that the coded data D2 that is transmitted from the encoding division 3 to the data storing division 4 at a constant speed would not overflow or underflow, though the data transmission speed of the streaming data D3, which is transmitted from the data outputting division 5, lowers to 64 [kbps] in t1 section and t3 section.

At the step SP18, the transmission controlling division 23 judges whether the data communication processing with respect to the contents data D1 has been ended or not, and, if it is not ended, the transmission controlling division 23 obtains the negative result and returns to the step SP15 again so as to repeat the above-mentioned processing.

If the positive result has been obtained at the step SP18, the transmission controlling division 23 decides that the data communication processing should be ended, goes to the following step SP19, and ends the compression rate controlling procedure.

In this case, the server 21 alters also the data transmission speed into 64 [kbps] or 128 [kbps] so as to adjust it to the real transmission speed by control of the transmission controlling division 23; however, the transmission may be performed with the fixed data transmission speed of 128 [kbps].

That is, hence the server 21 performs compression coding with the compression rate that has been almost doubled in accordance with the real transmission speed in t1 section and t3 section out of t1 section-t4 section, the server 21 is able to transmit A1 portion and A2 portion as well as C1 portion and C2 portion even if the real transmission speed of t1 section and t3 section is 64 [kbps].

Figure 6:
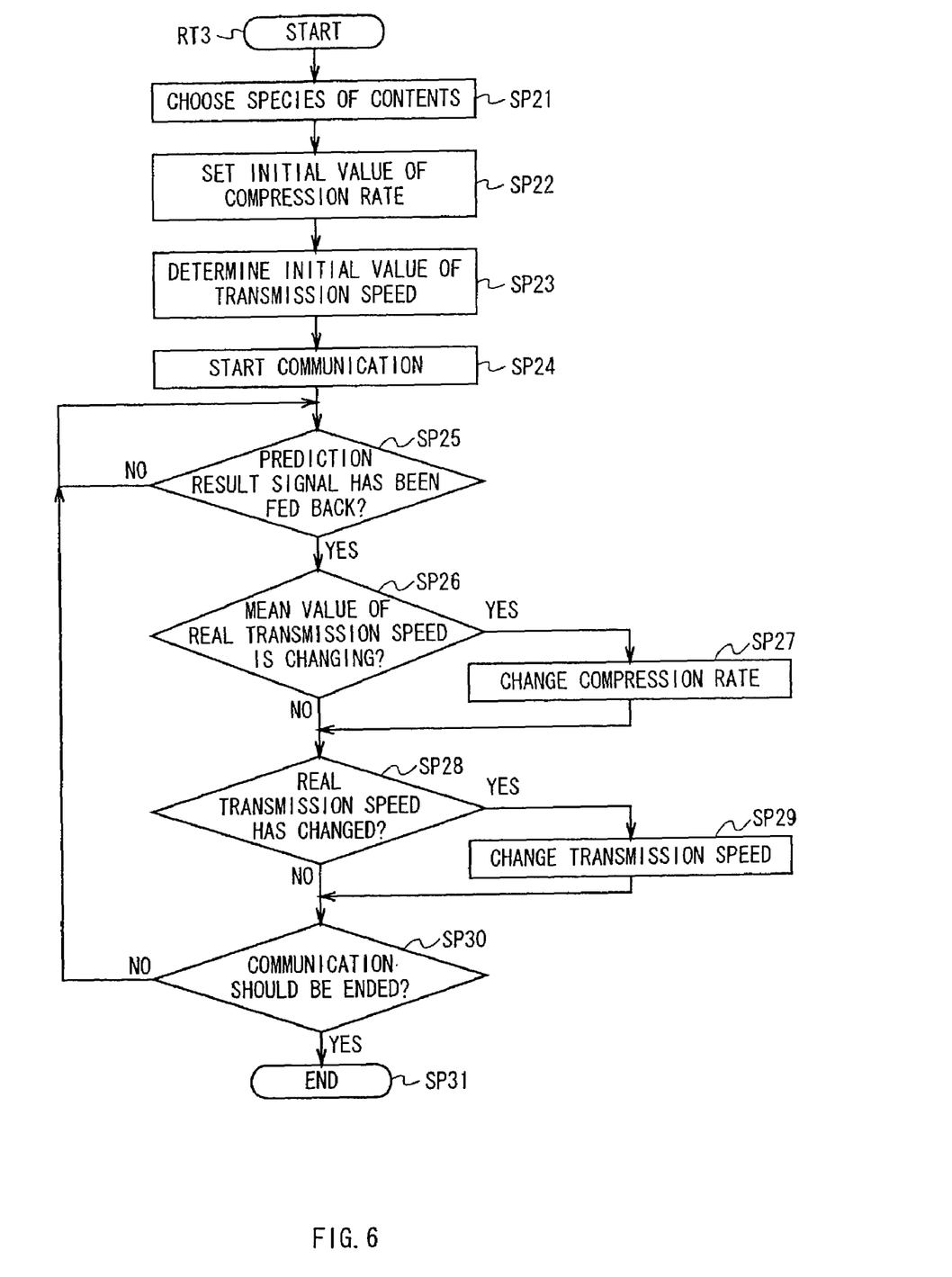
FIG. 6 is a flow chart showing a procedure of controlling the compression rate and the data communication speed that is corresponding with changes of the reception communication capacity. A schematic diagram showing an icon menu panel.

(4) Procedure of Controlling Transmission Speed and Compression Rate in Response to Changes of Reception Communication Capacity As shown in FIG. 6, the transmission controlling division 23 of the server 21 enters the start step of the routine RT3, and goes to the step SP21. In this connection, the steps SP21-SP25 are basically same as the steps SP1-SP5 of the transmission speed controlling procedure of the routine RT1.

At the step SP21, the transmission controlling division 23 chooses the species (motion picture data, text data, voice data and so on) of the contents data D1 that is to be transmitted to the portable radio terminal 22, and then goes to the following step SP22.

At the step SP22, the transmission controlling division 23 sets the initial value of compression rate at the encoding division 3, and then goes to the following step SP23. At the step SP23, the transmission controlling division 23 sets the initial value of data transmission speed at the data outputting division 5 to, for instance, 128 [kbps], and then goes to the following step SP24.

At the step SP24, the transmission controlling division 23 starts data communication processing by performing compression coding process, data outputting process and so on relevant to the contents data D1 by means of the encoding division 3 and the data outputting division 5, and then goes to the following step SP25.

At the step SP25, the transmission controlling division 23 judges whether the prediction result signal S4, which indicates real transmission speed, has been fed back to it from the reception controlling division 24 of the portable radio terminal 22 or not; if the negative result has been obtained, it waits for receiving of the feed-back while it continuing the data communication processing.

In contrast to this, when the positive result has been obtained at the step SP25, the transmission controlling division 23 goes to the following step SP26, monitors the prediction result signal S4, which is sequentially delivered from the reception controlling division 24 of the portable radio terminal 22, and judges whether the mean value of real transmission speed of each definite time has changed or not.

When the negative result has been obtained at this point, this means that the mean value of real transmission speed of each definite time of the portable radio terminal 22 has not changed, the transmission controlling division 23 do not perform controlling of compression rate, and goes to the following step SP28.

In contrast to this, when the positive result has been obtained at the step SP26, this means that the mean value of real transmission speed of each definite time of the portable radio terminal 22 has changed, the transmission controlling division 23 then goes to the following step SP27.

Figure 7:
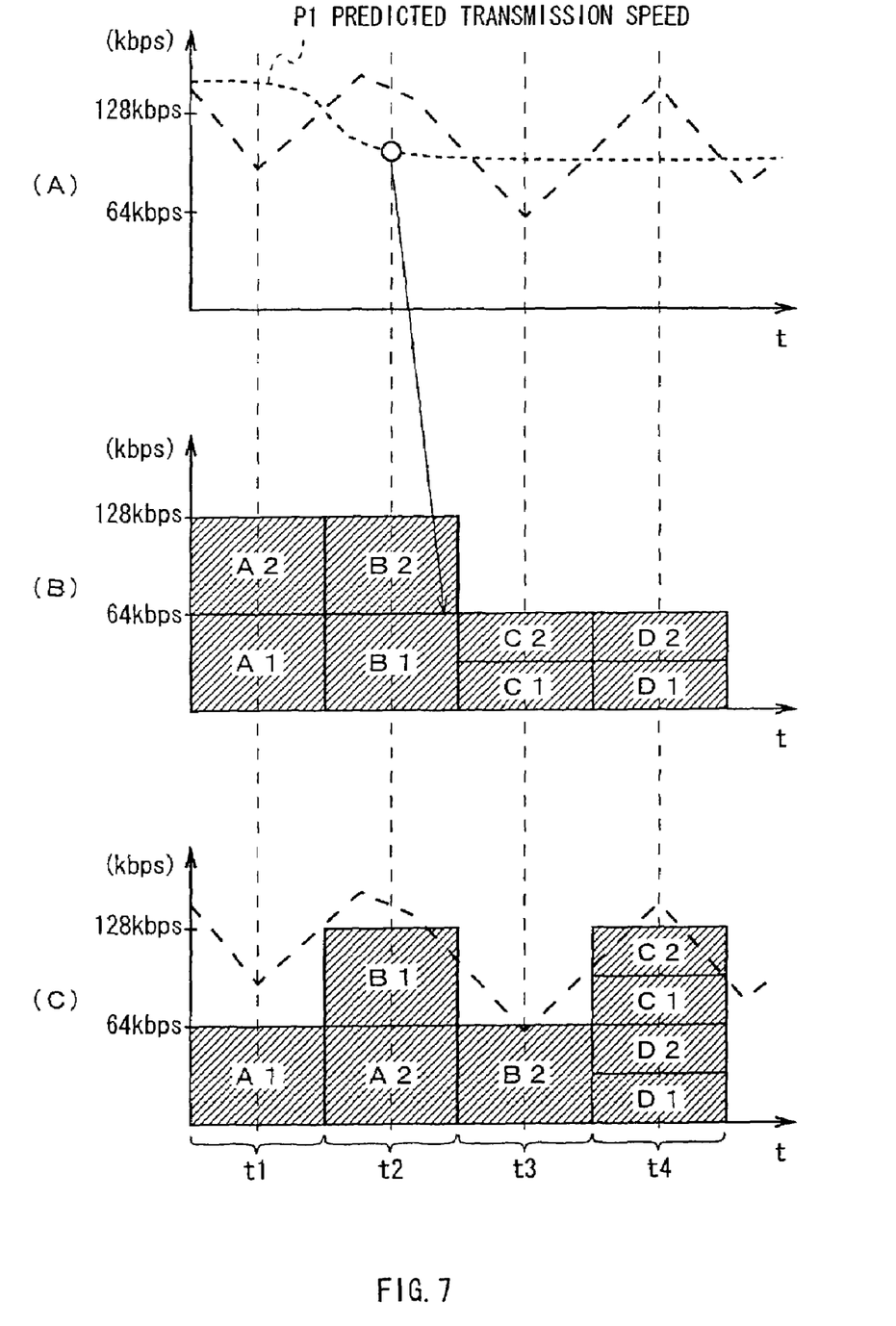
FIG. 7 is a schematic diagram showing a transmission situation of the case where the compression rate control processing and the data communication speed control processing has been carried out.

At the step SP27, the transmission controlling division 23 generates predicted transmission speed P1 (dotted line) that shows transition of the mean value of real transmission speed of each definite time like what is shown in FIG. 7(A), and determines the compression rate in the encoding division 3 in response to the predicted transmission speed P1.

That is, as shown in FIG. 7(B), the transmission controlling division 23 uses the initial value of compression rate as it is in t1 section and in t2 section, generates the compression rate controlling signal S1 for setting compression rate to the doubled value or so because the predicted transmission speed P1 lowers in t2 section and in the subsequent sections, outputs this to the encoding division 3, determines compression rate of each t1 section-t4 section previously, and goes to the following step SP28.

At the step SP28, the transmission controlling division 23 monitors the prediction result signal S4, which is sequentially delivered from the reception controlling division 24 of the portable radio terminal 22, and judges whether momentary changes exist in the real transmission speed or not.

If the negative result has been obtained at this point, the transmission controlling division 23 goes to the following step SP30. In contrast to this, when the positive result has been obtained at the step SP28, this means that a momentary change has been found in the real transmission speed as a result of monitoring of the prediction result signal S4, which is sequentially delivered from the reception controlling division 24 of the portable radio terminal 22, by the transmission controlling division 23, it then goes to the following step SP29.

At the step SP29, the transmission controlling division 23 outputs the data transmission speed controlling signal S2 to the data outputting division 5, so as to cause the data outputting division 5 to set data transmission speed of t1 section to 64 [kbps], to cause it to set data transmission speed of the following t2 section to 128 [kbps] that is the initial value, to cause it to set data transmission speed of t3 section to 64 [kbps] again, and to cause it to set data transmission speed of t4 section to 128 [kbps] that is the initial value as shown in FIG. 7 (C), in accordance with momentary changes in the real transmission speed in t1 section-t4 section, and then it goes to the following step SP30.

In this case, the transmission controlling division 23 transmits the streaming data D3 at a transmission speed that has been set in accordance with the actual momentary changes in real transmission speed in t1 section-t4 section.

That is, the transmission controlling division 23 transmits only A1 portion in t1 section at the transmission speed of 64 [kbps] that is applicable at that time, transmits A2 portion and B1 portion in t2 section at the transmission speed of 128 [kbps] that is applicable at that time, transmits only B2 portion in t3 section at the transmission speed of 64 [kbps] that is applicable at that time, and transmits C portion (C1 portion+C2 portion) and D portion (D1 portion+D2 portion) in t4 section at the transmission speed of 128 [kbps] that is applicable at that time.

Like this, the transmission controlling division 23 is able to perform compression coding with a compression rate that has been previously set in accordance with predicted transmission speed P1 that has been previously predicted seeing in perspective on the basis of the mean value of real transmission speed of each definite time, transmit the resulted streaming data D3 in accordance with the actual momentary changes in real transmission speed, and hereby send overall streaming data D3 without missing of it within t1 section-t4 section, although slight difference occurs in its transmission timing.

At the step SP30, the transmission controlling division 23 judges whether the data communication processing of the contents data D1 has been ended or not; if not ended, it obtains the negative result, returns to the step SP25, and repeats the above-mentioned processing.

When the positive result has been obtained contrarily at the step SP30, the transmission controlling division 23 decides that the data communication processing should be ended, goes to the following step SP31, and ends the procedure of controlling transmission speed and compression rate.

(5) Operation and Effects

In the above configuration, the transmission controlling division 23 of the server 21 receives feedback of real transmission speed that has been predicted in the reception controlling division 24 of the portable radio terminal 22, and controls the transmission speed of the streaming data D3, which is transmitted from the data outputting division 5, in real time in response to the momentary changes in real transmission speed; therefore, it is able to transmit data efficiently within the range of the maximum value of the real transmission speed in each of t1 section-t4 section even if the environment of communication in the communication channel 6 changes every moment. Besides, the transmission controlling division 23 of the server 21 receives feedback of real transmission speed that has been predicted in the reception controlling division 24 of the portable radio terminal 22, and controls the compression rate on the encoding division 3 in real time in response to the momentary changes in real transmission speed; therefore, it is able to transmit data efficiently within the range of the maximum value of the real transmission speed in each of t1 section-t4 section without missing of data even if the environment of communication in the communication channel 6 changes every moment.

In addition, the transmission controlling division 23 of the server 21 receives feedback of real transmission speed that has been predicted in the reception controlling division 24 of the portable radio terminal 22, previously calculates predicted transmission speed P1 on the basis of the mean value of real transmission speed that changes momentarily, performs compression coding on the encoding division 3 with the compression rate that has been previously determined in response to the very predicted transmission speed P1, and controls the transmission speed of the streaming data D3, which is transmitted from the data outputting division 5, in real time in response to the momentary changes in real transmission speed; therefore, it is able to surely execute data transmission efficiently within the range of the maximum value of the real transmission speed in each of t1 section-t4 section without missing of data even if the environment of communication in the communication channel 6 changes every moment.

By the way, in a usual portable telephone system that is comprised of base stations and portable radio terminals, transmission speed of data that is sent from the base station is controlled on the basis of CIR (Carrier Interference Ratio) signifying signal-to-noise ratio and so on that are notified from the portable radio terminal.

However, in the radio communication system 20 of the present invention, the server 21 receives a feedback notification of momentary real transmission speed in the communication channel 6 that has been predicted by the reception controlling division 24 of the portable radio terminal 22 on the basis of the packet-loss rate of the actually received streaming data D3, and the transmission controlling division 23 of the server 21 controls transmission speed and/or compression rate on the basis of the actual momentary real transmission speed in the communication channel 6, therefore, it is able to execute transmission speed controlling procedure that is more accurate and more excellent in communication throughput than a usual portable telephone system.

According to the above configuration, the transmission controlling division 23 of the server 21 controls transmission speed and/or compression rate on the basis of the momentary real transmission speed that actually changes in the communication channel 6, therefore it is able to execute data communication having excellent communication throughput and good quality, even if the communication state fluctuates.

(6) Other Embodiments

In the above embodiment, such a case has been described that the data transmission speed in the data outputting division 5 is set to either of 128 [kbps] and 64 [kbps], however we do not intend to limit the present invention to such; for instance, 3 or more species of transmission speed may be prepared, and any of them may be set by turns.

Besides, in the above embodiment, such a case has been described that the momentary real transmission speed in the communication channel 6 is predicted on the basis of the packet-loss rate that has been calculated by counting the number of packet error in the actually received streaming data D3 with the data receiving division 8 of the portable radio terminal 22, however we do not intend to limit the present invention to such; the momentary real transmission speed in the communication channel 6 may be predicted on the basis of bit-error rate, reception electric-field strength, and the other methods.

In addition, in the above embodiment, such a case has been described that the portable radio terminal 22 is used as a receiving apparatus, however we do not intend to limit the present invention to such; receiving apparatuses such as a portable telephone and a PDA (personal digital assistant) that has radio communication facility may be used.

As stated above, according to the present invention, by sequentially adjusting the transmission speed of data that is to be sent to the receiving apparatus, on the basis of the momentary real transmission speed on the communication channel that has been fed back from the receiving apparatus, and controlling the data communication speed to the receiving apparatus, it is able to implement data transmission processing that is accommodated to changes of transmission speed on communication channel in real time. In this way, it is able to realize data communication having excellent communication throughput and good quality even if the communication state fluctuates.

Besides, according to the present invention, by sequentially adjusting the compression rate of data that is to be sent to the receiving apparatus, in real time, on the basis of the momentary real transmission speed on the communication channel that has been fed back from the receiving apparatus, it is able to transmit data efficiently without missing of data even if the transmission speed on the communication channel fluctuates. In this way, it is able to realize data communication having excellent communication throughput and good quality even if the communication state fluctuates.

INDUSTRIAL APPLICABILITY

A data communication speed control system, a transmitting apparatus, and a receiving apparatus of the present invention are applicable to, for instance, a radio communication system in which the transmission speed is controlled in response to changes of the real transmission speed of the time when contents are transmitted from a server to a portable radio terminal.

The invention claimed is:

1. A data communication speed control system for controlling data communication speed, said system comprises:
   a receiving apparatus for sequentially detecting momentary real transmission speed in a communication channel, based on received data that has been delivered from a transmitting apparatus, the receiving apparatus sequentially transmits the real transmission speed to said transmitting apparatus; and said transmitting apparatus selects the species of the data and sets an initial transmission speed for the data based on the communication channel, the transmitting apparatus then sequentially adjusts the transmission speed of said data that is to be sent to said receiving apparatus, based on said real transmission speed, and controls said data communication speed between the transmitting apparatus and said receiving apparatus, wherein said real transmission speed over the communication channel is predicted based on the result of a calculated packet loss rate supplied from said receiving apparatus, and wherein said packet loss rate is calculated by counting the number of packet errors within received streaming data, and wherein said transmitting apparatus calculates predicted transmission speed on the basis of mean value of said real transmission speed in definite time that has been sequentially notified from said receiving apparatus, and controls the compression rate relevant to said data on the basis of transmission speed.

2. A transmitting apparatus comprising:

receiving means for sequentially receiving notifications of momentary real transmission speed in a communication channel that has been sequentially detected on the basis of received data that has been received via said communication channel, from a receiving apparatus;

transmission control means for selecting the species of the data and setting an initial transmission speed for the data based on the communication channel, the transmitting apparatus thereafter sequentially adjusting the transmission speed of data that is to be sent to said receiving apparatus, based on said real transmission speed, and controlling said data communication speed between the transmission control means and said receiving apparatus; and compression rate controlling means for calculating predicted transmission speed on the basis of mean value of said real transmission speed in definite time that has been sent from said receiving apparatus, and controlling the compression rate relevant to said data on the basis of the predicted transmission speed, wherein said real transmission speed over the communication channel is predicted based on the result of a calculated packet loss rate supplied from said receiving apparatus, and wherein said packet loss rate is calculated by counting the number of packet errors within received streaming data.

3. A receiving apparatus comprising:

real transmission speed notifying means for sequentially detecting momentary real transmission speed of a stated communication channel based on received data received via said communication channel, and sequentially notifying a transmitting apparatus; and receiving means for receiving data having a communication speed in said communication channel that is controlled by sequential adjustment by said transmitting apparatus based on said real transmission speed, wherein said real transmission speed over the communication channel is predicted based on the result of a calculated packet loss rate supplied from said receiving apparatus, and wherein said packet loss rate is calculated by counting the number of packet errors within received streaming data, wherein the transmitting apparatus selects the species of the data and sets an initial transmission speed for the data based on the communication channel, and wherein said transmitting apparatus calculates predicted transmission speed on the basis of mean value of said real transmission speed in definite time that has been sequentially notified from said receiving apparatus, and controls the compression rate relevant to said data on the basis of the predicted transmission speed.

4. The receiving apparatus according to claim 3, wherein said receiving means receives data that has been subjected to compression coding, by said transmitting apparatus, with the compression rate that has been controlled on the basis of predicted transmission speed that has been calculated on the basis of the mean value of said real transmission speed.

5. A data communication speed control system for controlling data communication speed, said system comprises:

a receiving apparatus for sequentially detecting momentary real transmission speed in a communication channel, based on received data that has been delivered from a transmitting apparatus, the receiving apparatus sequentially transmits the real transmission speed to said transmitting apparatus; and said transmitting apparatus selects the species of the data and sets an initial transmission speed for the data based on the communication channel, the transmitting apparatus thereafter sequentially adjusts the compression rate of said data that is to be sent to said receiving apparatus, on the basis of said real transmission speed, wherein said real transmission speed over the communication channel is predicted based on the result of a calculated packet loss rate supplied from said receiving apparatus, and wherein said packet loss rate is calculated by counting the number of packet errors within received streaming data, and wherein said transmitting apparatus calculates predicted transmission speed on the basis of mean value of said real transmission speed in definite time that has been sequentially notified from said receiving apparatus, and controls the compression rate relevant to said data on the basis of the predicted transmission speed.

6. A transmitting apparatus comprising:

receiving means for sequentially receiving notifications of momentary real transmission speed in a communication channel that has been sequentially detected on the basis of received data that has been received via the stated communication channel, from a receiving apparatus; and transmission control means for selecting the species of the data and setting an initial transmission speed for the data based on the communication channel, the transmitting apparatus thereafter sequentially adjusting the compression rate of data that is to be sent to said receiving apparatus, based on said real transmission speed, and for transmitting the data, wherein said real transmission speed over the communication channel is predicted based on the result of a calculated packet loss rate supplied from said receiving apparatus, and wherein said packet loss rate is calculated by counting the number of packet errors within received streaming data, and wherein said transmitting apparatus calculates predicted transmission speed on the basis of mean value of said real transmission speed in definite time that has been sequentially notified from said receiving apparatus, and controls the compression rate relevant to said data on the basis of the predicted transmission speed.

7. A receiving apparatus comprising:

real transmission speed notifying means for sequentially detecting momentary real transmission speed of a communication channel based on received data received via said communication channel, and sequentially notifying a transmitting apparatus; and receiving means for receiving data having a compression rate sequentially adjusted by said transmitting apparatus based on said real transmission speed, wherein said real transmission speed over the communication channel is predicted based on the result of a calculated packet loss rate supplied from said receiving apparatus, and wherein said packet loss rate is calculated by counting the number of packet errors within received streaming data, wherein the transmitting apparatus selects the species of the data and sets an initial transmission speed for the data based on the communication channel, and wherein said transmitting apparatus calculates predicted transmission speed on the basis of mean value of said real transmission speed in definite time that has been sequentially notified from said receiving apparatus, and controls the compression rate relevant to said data on the basis of the predicted transmission speed.

* * * * *